United States Patent
Fletcher et al.

(10) Patent No.: US 9,202,017 B2
(45) Date of Patent: Dec. 1, 2015

(54) CHANGING LEVELS OF QUALITY OF SERVICE

(71) Applicant: Verizon Patent and Licensing Inc., Basking Ridge, NJ (US)

(72) Inventors: Hugh Herrick Fletcher, Mountain View, CA (US); Piyush Jethwa, San Ramon, CA (US); Mark J. Hahn, Stow, MA (US); Harrison Duong, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 97 days.

(21) Appl. No.: 13/628,821

(22) Filed: Sep. 27, 2012

(65) Prior Publication Data
US 2014/0090010 A1   Mar. 27, 2014

(51) Int. Cl.
G06F 7/04 (2006.01)
G06F 21/00 (2013.01)
H04L 29/06 (2006.01)

(52) U.S. Cl.
CPC ............... *G06F 21/00* (2013.01); *H04L 63/00* (2013.01)

(58) Field of Classification Search
CPC .............................. G06F 21/00; G06F 17/3223
See application file for complete search history.

(56) References Cited

U.S. PATENT DOCUMENTS

| | | | |
|---|---|---|---|
| 2004/0228291 A1* | 11/2004 | Huslak et al. | 370/260 |
| 2004/0228363 A1* | 11/2004 | Adamczyk et al. | 370/468 |
| 2004/0230444 A1* | 11/2004 | Holt et al. | 705/1 |
| 2004/0230683 A1* | 11/2004 | Adamczyk et al. | 709/227 |
| 2004/0252698 A1* | 12/2004 | Anschutz et al. | 370/395.21 |
| 2009/0147792 A1* | 6/2009 | Anschutz et al. | 370/395.21 |
| 2009/0285218 A1* | 11/2009 | Adamczyk et al. | 370/395.21 |
| 2010/0161802 A1* | 6/2010 | Tofighbakhsh et al. | 709/226 |
| 2011/0208853 A1* | 8/2011 | Castro-Castro et al. | 709/223 |
| 2011/0320631 A1* | 12/2011 | Finkelstein | 709/232 |
| 2014/0020060 A1* | 1/2014 | Kotecha et al. | 726/3 |

OTHER PUBLICATIONS

Lalit R. Kotecha et al. entitled "Quality of Service Application", filed Jul. 12, 2012, as U.S. Appl. No. 13/547,660, 50 pages.

* cited by examiner

*Primary Examiner* — Shewaye Gelagay
*Assistant Examiner* — Khoi Le (57) ABSTRACT

A first network device is configured to receive information regarding a quality of service application that is part of an application stored on a device. The first network device is configured to further receive a request for a network to apply the level of quality service to the application stored on the device. The first network device is configured to further send an authorization request to the second network device. The first network device is configured to further receive an authorization result from the second network device. The first network device is configured send a first message to a third network device and receiving a response from the third network device that the level of quality of service is applied to the information; and send a message to the provider that the level of quality of service is applied to the information.

20 Claims, 8 Drawing Sheets

CHANGING LEVELS OF QUALITY OF SERVICE

BACKGROUND

A user may use various types of different applications on a device. The application could be an audio, video, or voice application. The content sent to/from the application may have a default level of quality of service.

DETAILED DESCRIPTION OF PREFERRED EMBODIMENTS

The following detailed description refers to the accompanying drawings. The same reference numbers in different drawings may identify the same or similar elements.

Systems and/or methods described herein may increase or decrease the level of quality of service (to be referred to as "QoS") to an application. The application may be an audio application (e.g., Pandora), a video application (e.g., Hulu), or a voice application (e.g., Skype) that is stored on a user device. Changing the level of QoS to the application may improve a user's experience when using that application.

Figure 1A:
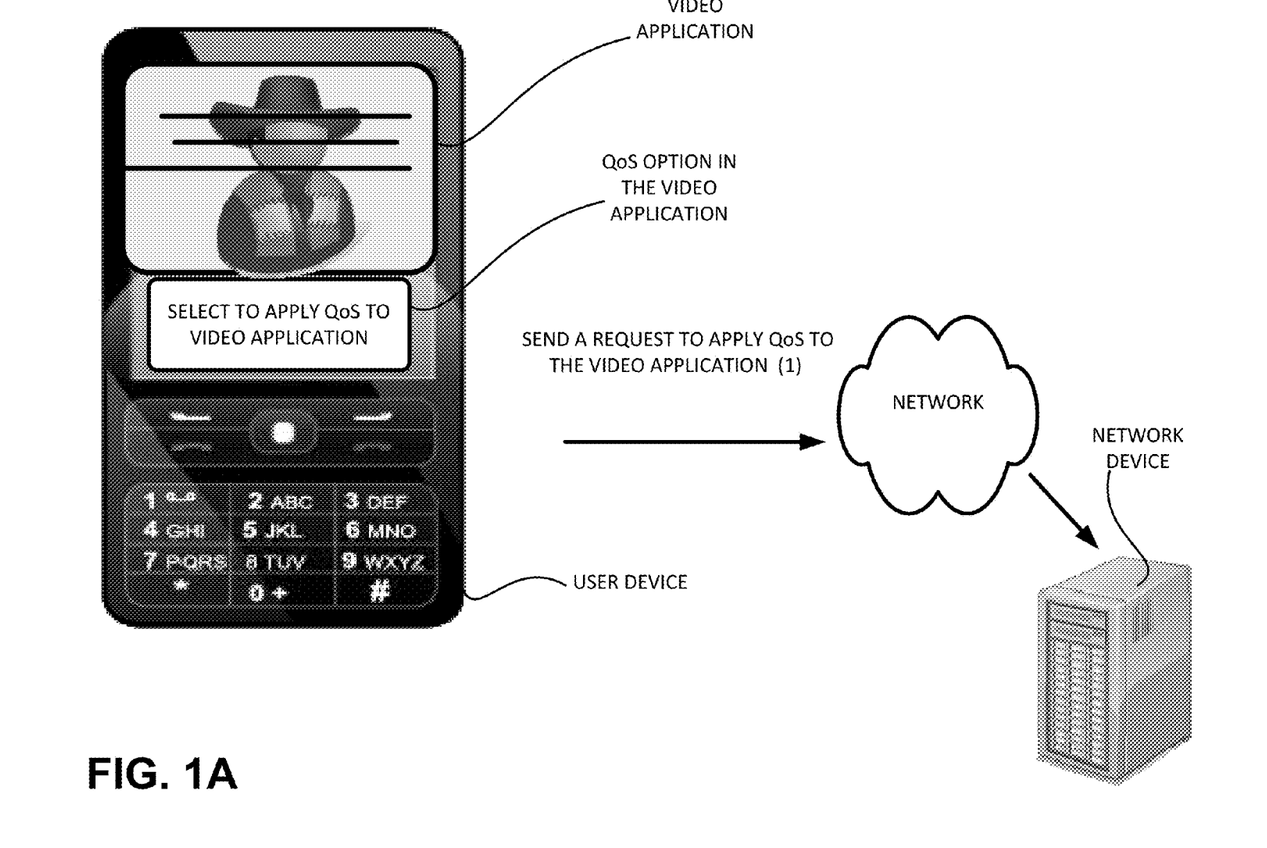
FIGS. 1A-1B are diagrams of an overview of an implementation described herein.
Figure 1B:
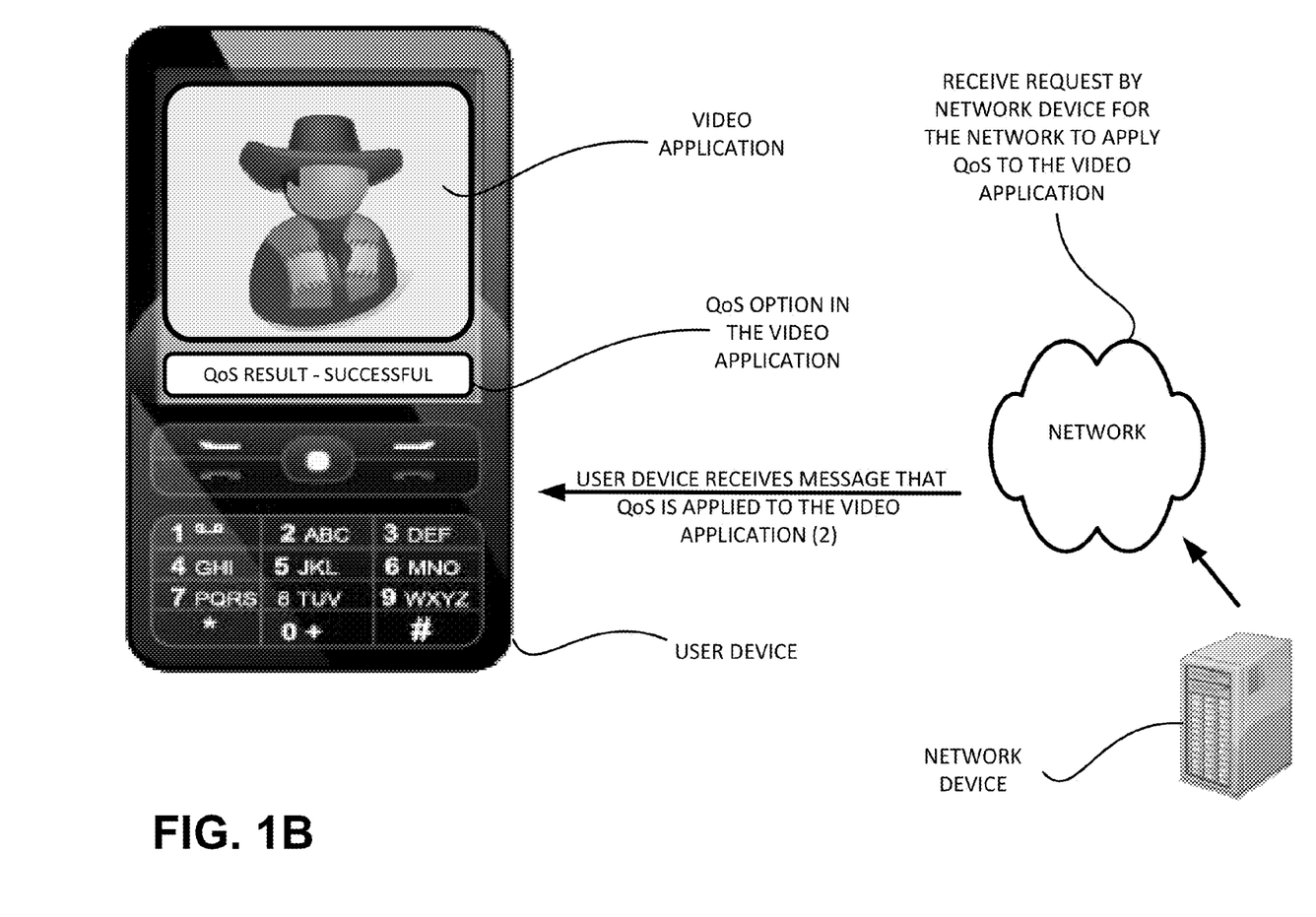

FIGS. 1A-1B are diagrams of an overview of an implementation described herein. FIG. 1A shows a user device, a network, and a network device. In practice, there may be additional, or fewer, user devices, networks, and/or network devices. As shown in FIG. 1A, a user, of the user device, may want to apply a level of QoS to an application that is currently being used on the user device. The application, for example, could be a video application that is being used by the user to watch a movie. Assume that while the user is watching the movie, lines begin to appear in the movie display. The lines may be a result of congestion (e.g., too much traffic) in the network. The user may decide that the user would like to remove the lines by requesting a higher level of QoS which will provide the user a preferential level of service from the network. The user, of the user device, may request the higher level of QoS for the video application by using a QoS option in the video application. The user device may send a request, to a network device, so that the network device may authorize the video application and the user device so that the network may apply a higher level of QoS (see communication (1)), to the video application.

As shown in FIG. 1B, the network device may notify the network to apply a level of QoS to the video application. The network device may send a message indicating a QoS result (see communication (2)) to the user device. The QoS result may be successful or unsuccessful. A successful result may indicate, to the user, that a level of QoS is applied to the video application. As shown in FIG. 1B, the user, of the user device, receives a message indicating a successful QoS result. The video application may now have a level of QoS applied by the network. While the application discussed in the above example is a video application, the application may be an audio application, voice application, or any other type of application.

As a result, the user may receive a particular level of QoS for an application that is being used on the user device. Thus, the application, being used on the user device, may provide the user, of the user device, a better experience (e.g., clearer voice capabilities for a voice application, unfettered streaming for an audio or video application, etc.) than using the application without applying a level of QoS to the application.

Figure 2:
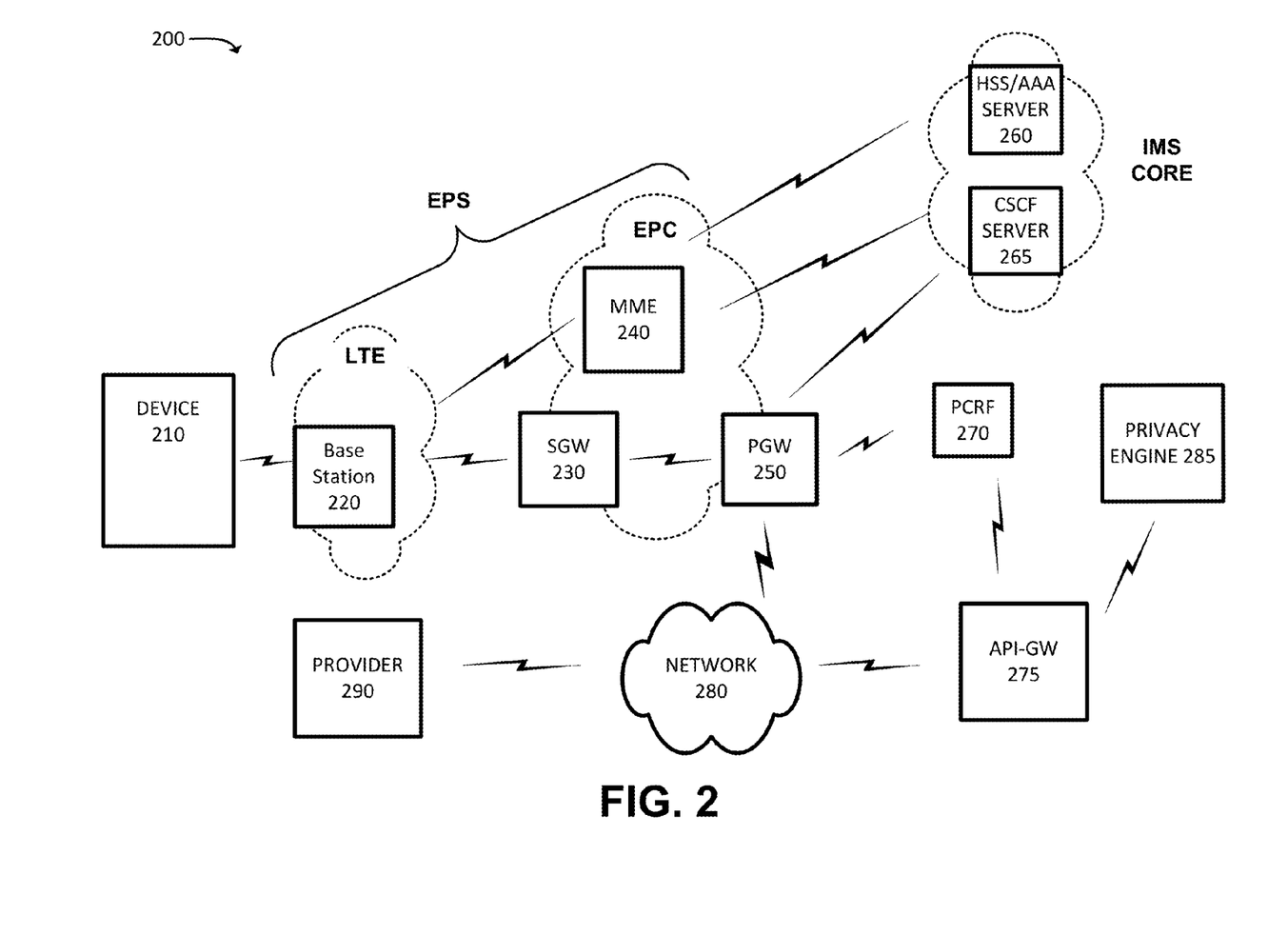
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a device 210, a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/authentication, authorization, accounting (AAA) server 260 (hereinafter referred to as "HSS/AAA server 260"), a call session control function (CSCF) server 265 (hereinafter referred to as "CSCF server 265"), a policy and charging rules function device 270 (hereinafter referred to as "PCRF 270"), an application programming interface gateway 275 (hereinafter referred to as "API-GW 275"), a network 280, a privacy engine 285, and a provider 290. The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes an LTE network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, PGW 250, PCRF 270, and/or API-GW 275 that enables device 210 to communicate with network 280 and/or an Internet protocol (IP) multimedia subsystem (IMS) core. The IMS core may include HSS/AAA server 260 and/or CSCF server 265 and may manage authentication, session initiation, account information, a user profile, etc. associated with user device 210. The combination of the access network, the EPC, and the IMS core may be defined as a long term evolution (LTE) network. The access network may include multiple base stations 220, and the EPC may include multiple SGWs 230, MMEs 240, PGWs 250, PCRFs 270 and/or API-GWs 275. The IMS core may include multiple HSS/AAA servers 260 and/or CSCF servers 265.

Device 210 may include any computation or communication device that is capable of communicating with a network (e.g., network 280). For example, device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, a meter, a vending machine, a medical device (e.g., a dialysis machine), or any other type of mechanical, mobile, computation, or communication device.

Device 210 may include a variety of applications that may be capable of requesting and/or changing a level of QoS, such as, for example, a QoS application, a machine to machine application (e.g., associated monitoring flow rates of information), an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Base station 220 may include one or more network devices that receive, process, and/or transmit traffic, such as audio, video, text, and/or other data, destined for and/or received from device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from device 210 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-base station handovers, and may act as an anchor for mobility between LTE and other 3GPP technologies.

MME 240 may include one or more network devices that gather, process, search, store, and/or provide information in a manner described herein. For example, MME 240 may perform operations associated with a handoff to and/or from the EPS. MME 240 may perform operations to register device 210 with the EPS, to hand off device 210 from the EPS to another network, to hand off device 210 from the other network to the EPS, and/or to perform other operations. MME 240 may perform policing operations for traffic destined for and/or received from device 210.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of device 210 to external packet data networks by being a traffic exit/entry point for user device 210. PGW 250 may perform policy enforcement, packet filtering, charging support, lawful intercept, and packet screening. PGW 250 may also act as an anchor for mobility between 3GPP and non-3GPP technologies.

HSS/AAA server 260 may include one or more network devices, or other types of computation or communication devices, that gather, process, search, store, and/or provide information in a manner described herein. For example, HSS/AAA server 260 may manage, authenticate, update, and/or store, in a memory associated with HSS/AAA server 260, profile information associated with device 210 that identifies applications and/or services that are permitted for and/or accessible by device 210, bandwidth or data rate thresholds associated with the applications or services, information associated with a user of device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with device 210.

CSCF server 265 may include one or more network devices, or other types of computation or communication devices, that gather, process, search, store, and/or provide information in a manner described herein. CSCF server 265 may process and/or route calls to and from device 210 via the EPC. For example, CSCF server 265 may process and manage sessions that are associated with audio communications, multimedia calls, video streaming communications, and/or other types of communications that are received from network 280, and that are destined for device 210. In another example, CSCF server 265 may process and manage sessions (as described above) received from device 210, that are destined for network 280.

PCRF 270 may include one or more network devices, or other types of computation or communication devices, that gather, process, search, and/or provide information in a manner described herein. PCRF 270 may also store subscriber information, such as voice call and data rate plans or quotas for subscribers. PCRF 270 may provide network control regarding service data flow detection, gating, QoS, and/or flow based charging. Policies and rules regarding QoS may include policies and rules instructing device 210 and network elements (base station 220, SGW 230, MME 240, PGW 250, etc.) to minimize packet loss, to implement a packet delay budget, to provide a guaranteed bit rate (GBR), to provide a particular latency, and/or to perform other activities associated with QoS. PCRF 270 may provide policies and rules to other network devices, such as HSS/AAAS server 260, API-GW 275, and/or PGW 250, to implement network control. PCRF 270 may determine how a certain service data flow shall be treated, and may ensure that user plane traffic mapping and QoS is in accordance with a user's profile and/or network policies.

API-GW 275 may include one or more network devices that gather, process, search, store, and/or provide information in a manner described herein. API-GW 275 may include one or more data processing and/or traffic transfer devices, such as a gateway, a router, a modem, a switch, a firewall, a NIC, a hub, a bridge, a proxy server, an OADM, or some other type of device that processes and/or transfers traffic. API-GW 275 may forward information about an application, functioning on device 210, to privacy engine 285 so that privacy engine 285 may authorize the application.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

Privacy engine 285 may include one or more network devices, or other types of computation or communication devices, that gather, process, search, store, and/or provide information in a manner described herein. For example, privacy engine 285 may authorize, update and/or store, in a memory associated with privacy engine 285, profile information (e.g., user device identifier) associated with device 210. Additionally, or alternatively, privacy engine 285 may authorize, update and/or store information associated with applications that are registered with the network to implement changes to the QoS for the application. Privacy engine 285 may be part of API-GW 275 or may be a separate device from API-GW 275. Privacy engine may be a part of HSS/AAA server 260 or may be a separate device from HSS/AAA server 260.

Provider 290 may include one or more network devices, or other types of computation or communication devices, that provide any type of application or application service. For example, provider 290 may provide an application, such as Skype, Hulu, Netflix, or Vonage, and/or a service related to the application. In some implementations, provider 290 may provide any application that can be used on device 210 to communicate any media stream, such as a video stream, an audio stream, a textual stream, and/or any other type or form of content. Provider 290 may provide applications and/or services, such as games, scripts, and/or messaging services that may be used on device 210. In some other implementations, provider 290 may provide machine to machine applications. For example, provider 290 may be associated with a utility company that is providing an application to device 210 (e.g., such as a meter) to monitor the amount of data flows to/from device 210.

Figure 3:
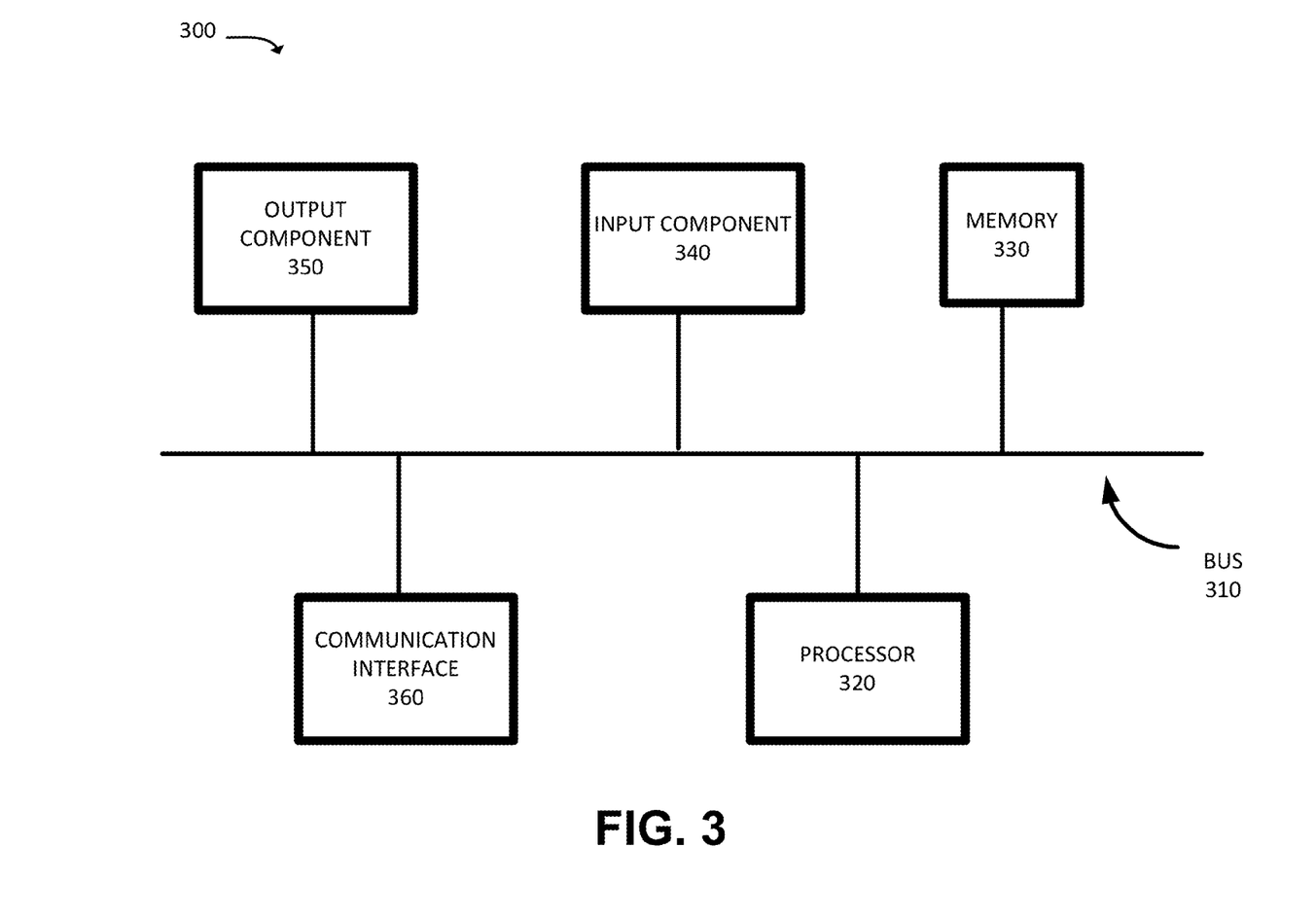
FIG. 3 is a diagram of example components of one or more devices of FIGS. 1A-1B and 2.

FIG. 3 is a diagram of example components of a device 300. Device 300 may correspond to device 210, base station 220, SGW 230, MME 240, PGW 250, HSS/AAA server 260, CSCF server 265, PCRF 270, API-GW 275, privacy engine 285 and/or provider 290. Additionally, or alternatively, each of device 210, base station 220, SGW 230, MME 240, PGW 250, HSS/AAA server 260, CSCF server 265, PCRF 270, API-GW 275, privacy engine 285 and/or provider 290 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a microphone, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 280 and/or devices connected to network 280.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
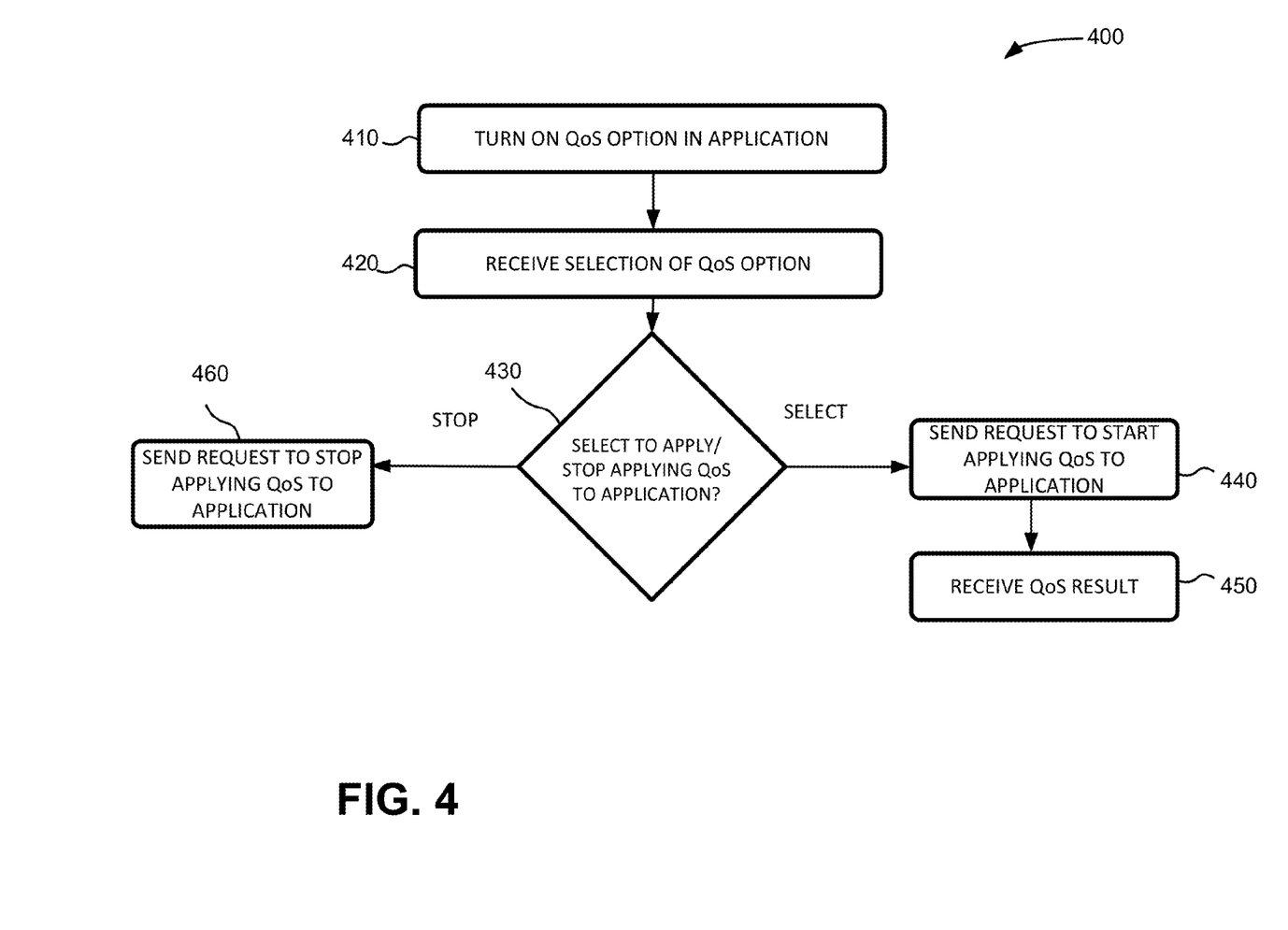
FIG. 4 is a flow chart of an example process for applying quality of service to an application.

FIG. 4 is a flow chart of an example process 400 for applying QoS to an application. In one implementation, process 400 may be performed by device 210. In another example implementation, one or more blocks of process 400 may be performed by one or more other devices, such as API-GW 275.

Process 400 may include turning on a QoS option in an application (block 410). For example, device 210 may have a QoS option in an application. The QoS option within the application may be accessed and changed by a party associated with provider 290. The QoS option may be defined by provider 290 to only provide certain levels of QoS service (e.g., a video application may only have three levels of quality of service available, an audio application may only have two levels of quality of service available, etc.). The application may be implemented in the memory of device 210. The QoS option in the application may allow a user, of device 210, to apply a level of QoS to the application (e.g., a voice application, an audio application, a streaming video application, etc.). In one example implementation, the QoS option, in the application, may automatically turn on when the application is initiated. In another example implementation, the QoS option, in the application, may be turned on when instructed by the user of device 210. For example, there may be an indicator on the display of device 210 that, when selected, may turn on the option in the application. The QoS option may include information regarding a current level of QoS. The current level of QoS may be displayed to the user.

Process 400 may include receiving a selection of the QoS option (block 420). For example, the user, of device 210, may select a QoS option, in the application, to apply, or to stop applying, a level of QoS to device 210 and/or to the application stored on device 210. The user, of device 210, may select to apply a level of QoS to device 210 and/or the application being used on device 210. Alternatively, the user may select to stop applying any level of QoS to device 210 and/or to the application stored on device 210. The user may select to apply (or stop applying) QoS to an application before, during, or after, the application is used on device 210.

The user may be given an option to select different levels of QoS. The user may be provided the option of selecting different levels of quality of service class identifier (to be referred to as "QCI") to be applied to the application. For example, the user may select a level of bandwidth, transfer rate and/or other factor (e.g., a request for a clearer display) that is associated with a level of QoS, such as any of QCI 1 through QCI 9.

The user may be given the option to arrange different blocks of time with different levels of QoS for an application. For example, the user may choose QCI 1 service for Monday to Friday from 7 am to 5 pm, for the application, and may choose no premium QoS treatment at all other times, for the same application.

The user may be given an option to change the level of QoS for the application. For example, the user may change the level of QoS, for the application, from QCI 6 to QCI 2 (or vice versa), before, while, or after the application is used on device 210.

The user, of device 210, may use the application (on device 210) to select different applications that may be applied with different levels of QoS. For example, the user may have application A (e.g., a video application) and application B (e.g., a voice application) stored on device 210. The user may select to apply a level of QoS for application A and no level of QoS for application B. Alternatively, the user may select to apply a level of QoS (e.g., QCI 1) for application A and another level of QoS (e.g., QCI 6) for application B at the same time.

If the QoS request is to apply QoS to the application (block 430-SELECT), process 400 may include sending the QoS request to apply a level of QoS to the application (block 440). For example, device 210 may send a request to apply QoS to the application, to API-GW 275.

The QoS request may be a request to apply a level of QoS to the application. To send the QoS request, device 210 may establish a connection with network 280. With a connection to network 280, device 210 may send the QoS request to provider 290, via PGW 250. The QoS request may include identifier information for device 210 (e.g., the MDN for device 210), the IP address for device 210, identifier information for a user of device 210, identifier information for provider 290, and/or identifier information for the application.

Provider 290 may send the QoS request to API-GW 275. API-GW 275 may receive the QoS request. The QoS request, from provider 290, may include the IP address for provider 290, the IP address for device 210, the identifier for device 210, and/or the identifier information for the application. API-GW 275 may be accessed by provider 290, or another device. Provider 290 (or the other device) may receive selections (e.g., from another device 210 associated with provider 290) that allows for creating a QoS session by using the QoS application within the application associated with provider 290. Provider 290 may send the selections to API-GW 275. API-GW 275 may receive the information associated with creating a QoS session using the QoS application within the application. The information associated with creating the QoS session may define which QCI levels can be applied to the application. For example, provider 290 may be associated with a video content provider that provides a video application to device 210. Provider 290 may receive selections regarding creating a QoS application that is within the video application. The QoS session may be created to provide QCI levels 3, 4, or 5. API-GW 275 may receive and store information, from different providers 290, associated with creating QoS sessions for multiple types of applications. For example, API-GW 275 may store QoS session parameters for a voice over IP application (VoIP) and API-GW 275 may also store QoS session parameters for a real-time gaming application.

API-GW 275 may send an authorization request to privacy engine 285. The authorization request may include the IP address for provider 290, the IP address for device 210, the identifier information for device 210, and/or the identifier information for the application. Privacy engine 285 may analyze the information in the authorization request. Privacy engine 285 may analyze the identifier information for device 210 to determine that device 210 is a valid device and may analyze the identifier information for the application to determine that the application is a valid application to receive QoS changes.

The authorization by privacy engine 285 may be successful or unsuccessful. For example, a successful authorization by privacy engine 285 may be a result of confirming that the application and device 210 are registered with the network (e.g., device 210 has permission to use the network devices of the EPS and the IMS core portions of the LTE network described with regard to FIG. 2 and the application may receive QoS from the access and EPC portions of the LTE network).

With a successful authorization, privacy engine 285 may send the authorization result to API-GW 275. The authorization result may include information that device 210 and the application are authorized. API-GW 275 may store the authorization result. API-GW 275 may store the authorization result as long as device 210 is using the application during a session. Once the session is over, API-GW 275 may receive a message from provider 290 that the session is over and API-GW 275 may remove the authorization result. API-GW 275 may send a message to PCRF 270 to apply the requested QoS level. The message (from API-GW 275) may be based on information received (as described above) from provider 290 regarding the parameters for the QoS application within the application.

PCRF 270 may send a message to PGW 250 to apply the requested QoS level. PGW 250 may send messages to other network devices (base station 220, SGW 230, MME 240, etc.) to initiate a process to apply the level of QoS to information sent between the application and provider 290. API-GW 275 may send a message, to provider 290, that the requested level of QoS is applied to the application.

Alternatively, an unsuccessful authorization by privacy engine 285 may be a result of the application not being authorized to receive changes to the QoS for the application. Privacy engine 285 may send the unsuccessful authorization result to API-GW 275. With an unsuccessful authorization result, API-GW 275 may not send a message to PCRF 270, so that PCRF 270 does not initiate a process to apply a level of QoS to the information sent between the application and provider 290.

API-GW 275 may receive the authorization result and API-GW 275 may send a QoS result to provider 290. The QoS result may include information that device 210 and/or the application are not authorized. The QoS result may include information that the requested level of QoS is not to be applied to device 210; the application; and the information sent between the application and provider 290. API-GW 275 may store the authorization result.

Process 400 may include receiving the QoS result (block 450). For example, device 210 may receive the QoS result from provider 290. The user, of device 210, may view a message (from provider 290) on device 210 that the level of QoS will be applied to the application. The information, sent between the application and provider 290, may now have a level of QoS applied by network elements (described in block 440) such as base station 220, SGW 230, MME 240, and/or PGW 250, in the LTE network (described with regard to FIG. 2).

In some implementations, the information (e.g., video, voice, etc.) sent between the application (on device 210) and provider 290 may traverse PGW 250 and may not traverse through API-GW 275 and/or PCRF 270.

The user, of device 210, may be charged a fee for receiving the level of QoS for the application. For example, as the application sends or receives an amount of information (applied with a level of QoS) to and/or from provider 290, PGW 250 may send data about the amount of information (e.g., time of use, bandwidth, data usage) to another network device (e.g., HSS/AAA server 260, billing server, etc.) so that a fee (e.g., fixed fee, per hour fee, etc.) may be charged to the user.

Alternatively, the user, of device 210, may view a message on device 210 that the QoS request is not successful and the requested level of QoS will not be applied to the application. The message may include information that the application is not authorized (e.g., the application is not authorized for requesting the level of QoS). The message may include an option for the user, of device 210, to select another level of QoS to be applied to the application. For example, the user, of device 210, may be given an option to select a lower level of QoS (e.g., QCI 5) instead of the original requested level of QoS (e.g., QCI 2).

If the QoS request to stop applying QoS is selected (block 430-STOP), process 400 may include sending a request to stop applying a level of QoS to the application (block 460). For example, the user, of device 210, may want to stop applying a level of QoS to the application being used on device 210. The request to stop applying the level of QoS to the application may be sent from device 210 to provider 290. Provider 290 may send the request to API-GW 275. API-GW 275 may receive the request to stop applying the level of QoS to the application.

API-GW 275 may send a message to PCRF 270 to stop the level of QoS from being applied to the application and/or device 210. PCRF 270 may send a message, using policies and rules, to the network elements (e.g., SGW 240, PGW 250, etc.) to stop applying the level of QoS. The network elements may stop applying a level of QoS to device 210 and/or the application. PGW 250, or PCRF 270, may notify API-GW 275 that the level of QoS is no longer being applied to the application and/or device 210.

API-GW 275 may communicate, to provider 290, that the level of QoS is no longer applied to the application and/or device 210. Provider 290, via PGW 250, may communicate to device 210 that the level of QoS being applied to the application has stopped. The user, of device 210, may receive a message (from provider 290 or API-GW 275) that no level (or a default level) of QoS is being applied to the application on device 210.

The application may send and receive information from provider 290 via PGW 250 with the default level of QoS being applied to information being sent between the application and provider 290.

Figure 5:
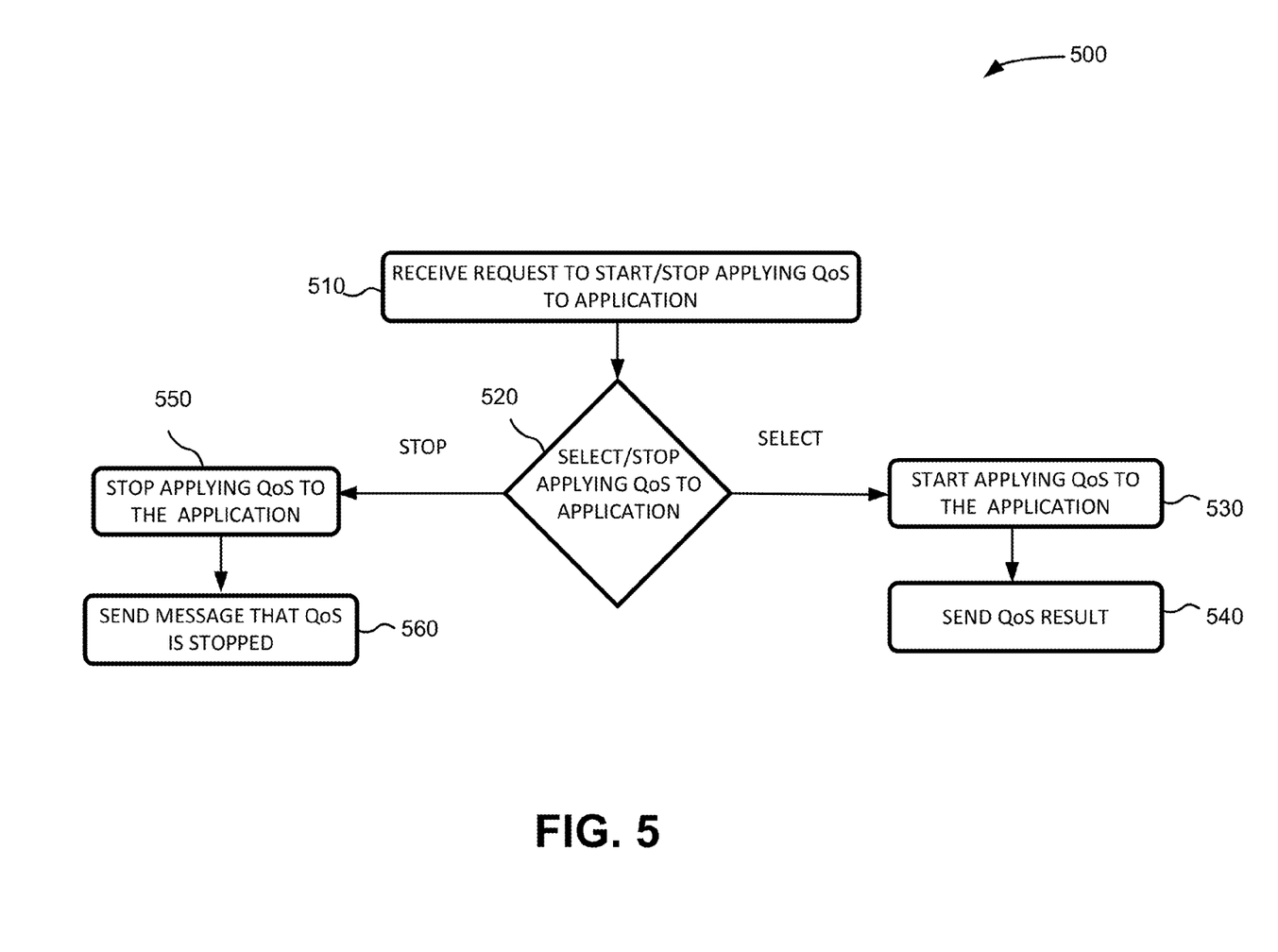
FIG. 5 is a flow chart of an example process for applying quality of service to an application.

FIG. 5 is a flow chart of an example process 500 for applying QoS to an application. In one implementation, process 500 may be performed by API-GW 275. In another example implementation, one or blocks of process 500 may be performed by one or more other devices, such as PGW 250 or device 210.

Process 500 may include receiving a request to apply, or to stop applying, a level of QoS to an application (block 510). For example, API-GW 275 may receive a QoS request from device 210, described with regard to FIG. 4. The request may be to start applying a level of QoS to device 210 and/or an application stored on device 210. Alternatively, the request may be to stop applying a level of QoS to device 210 and/or the application stored on device 210.

If the request is to apply a level of QoS to the application (block 520-SELECT), process 500 may include applying a level of QoS to the application (block 530). For example, API-GW 275 may receive a request to apply a level of QoS to device 210 and/or the application stored on device 210. API-GW 275 may receive the request from provider 290 (which may receive the request for device 210). API-GW 275 may determine the level of QoS request based on QoS parameters for the application stored by API-GW 275 (described with regard to FIG. 4). API-GW 275 may determine that the application may be authorized by privacy engine 285. API-GW 275 may send an authorization request to privacy engine 285, so that privacy engine 285 may authorize the application. Privacy engine 285 may authorize the application, described with regard to FIG. 4. Privacy engine 285 may send the authorization result to API-GW 275. The authorization result may be successful, or the authorization result may not be successful. If the authorization result is successful, API-GW 275 may send a message to PCRF 270 to implement the requested level of QoS, as described with regard to FIG. 4. PGW 250, or PCRF 270, may notify API-GW 275 that the level of QoS is applied to the application.

Process 500 may include sending the QoS result (block 540). For example, API-GW 275 may send the QoS result to provider 290. Provider 290 may send the QoS result to device 210, via PGW 250. Device 210 may receive the QoS result and the user, of device 210, may view a message (on device 210) about whether the level of QoS is applied to the application.

When the level of QoS is applied to the application, information sent between device 210 and provider 290 may be sent, with the level of QoS, through base station 220, SGW 230, PGW 250, and/or other network devices within the EPC and the access network portions of the LTE network.

If the request is to stop applying QoS to the application (block 520-STOP), process 500 may include discontinuing to administer a level of QoS to the application (block 550). For example, API-GW 275 may receive a request to stop applying QoS from the user of device 210 (via provider 290). In one example implementation, API-GW 275 (via PCRF 270) may stop the level of QoS from being applied to the application, described with regard to block 460 in FIG. 4.

Process 500 may include sending a message that the level of QoS is stopped (block 560). The user, of device 210, may view a message, from API-GW 275 (or provider 290), on device 210, that the level of QoS being applied to the application is stopped.

In some example implementations, device 210 may itself determine the level of QoS that may be applied to an application stored on device 210. For example, the application may be associated with sending information relating to energy consumption for a manufacturing plant. Device 210 (e.g., a meter) may determine that when the manufacturing plant is closed that the amount of information being sent from device 210 may be sent by applying a lower level of QoS. Device 210 may determine that a lower level of QoS is sufficient for the amount of information, since a higher level of QoS may cost the manufacturing plant more than the lower level of QoS. By using the application, device 210 may interact with provider 290, API-GW 275, and the other network devices (as described in FIGS. 4 and 5) to request the lower level of QoS.

Figure 6A:
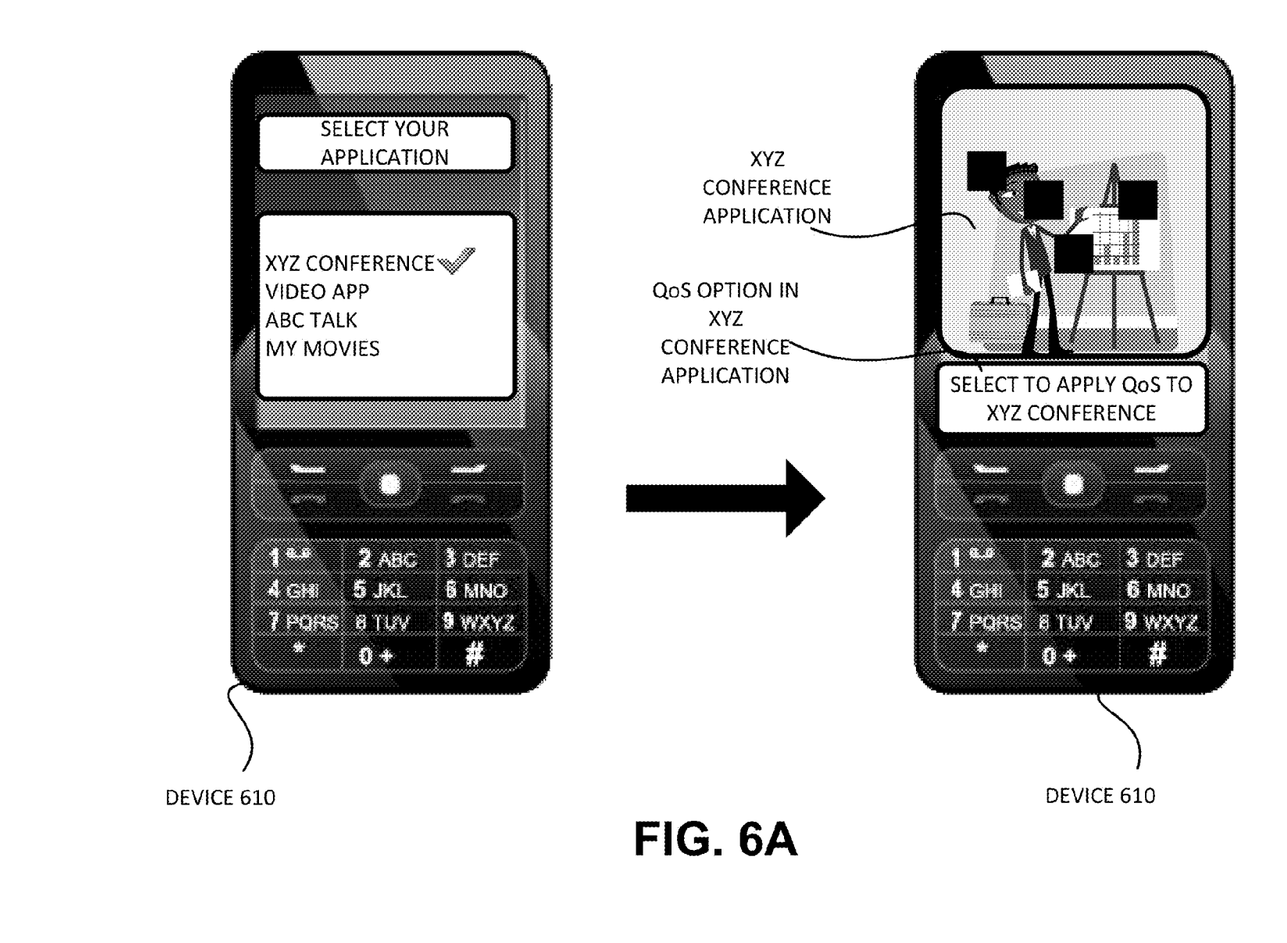
FIGS. 6A-6B are diagrams of example processes for applying a level of quality of service to an application.

FIG. 6A is a diagram of an example process for applying a level of QoS to an application. FIG. 6A shows a device 610. An example of device 610 may correspond to device 210, described with regard to FIG. 2. As shown in FIG. 6A, a user ("Ben"), of device 610, may decide to select an application. Ben may have several different applications from which to select. Ben decides to select the application called XYZ conference, which is a video application that allows Ben to view presentations being given by his fellow employees at work. As shown in FIG. 6A, the XYZ conference application may now be displayed on device 610. As Ben is viewing a presentation, black pixels begin to appear on the display. The XYZ conference application provides an option for Ben to apply QoS to the XYZ conference application. By applying QoS to the XYZ conference application, Ben may be able to stop the black pixels from appearing on the screen. Ben decides to select the QoS option, in the XYZ conference application, to apply a level of QoS to the XYZ conference application.

Figure 6B:
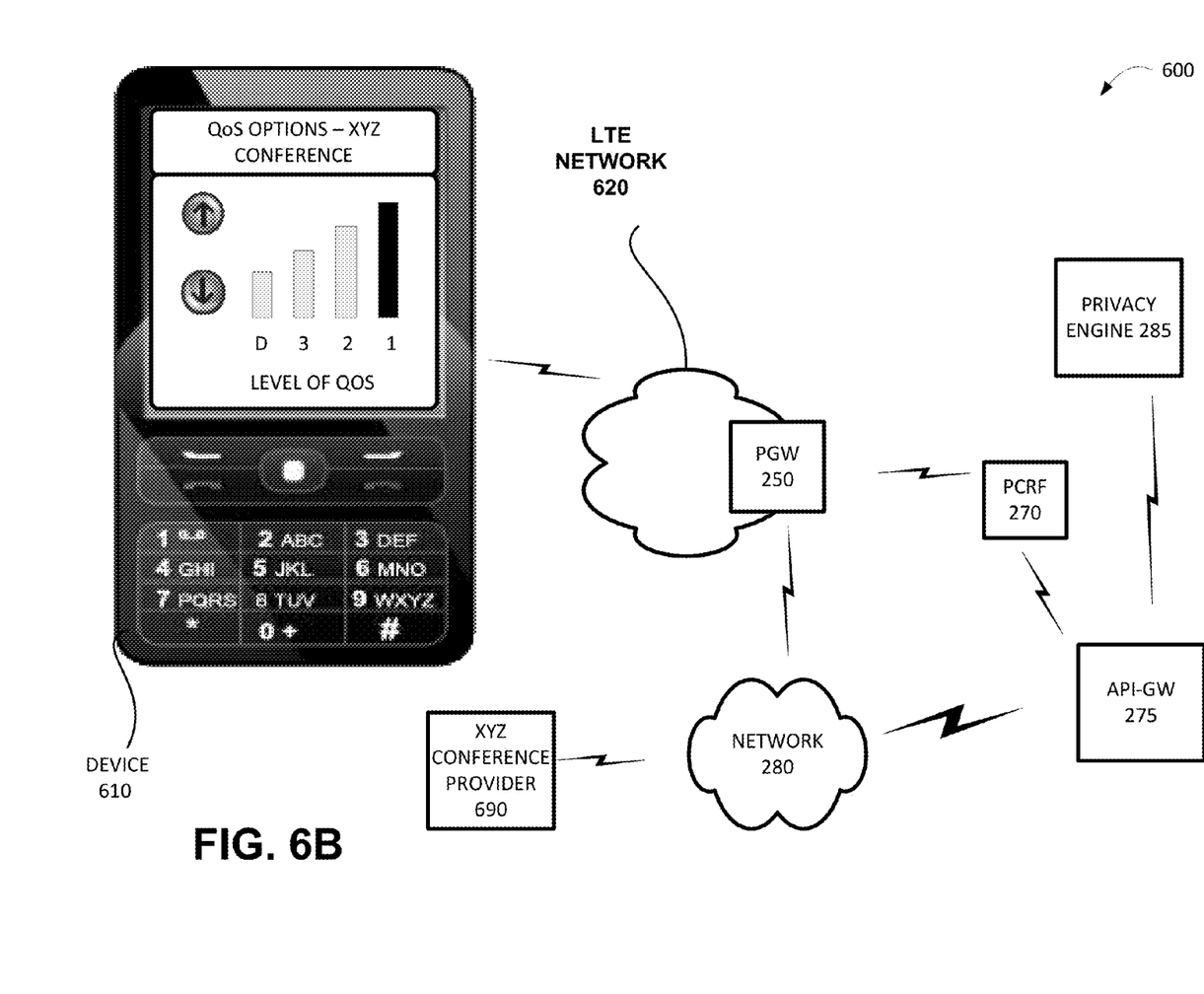

FIG. 6B is a diagram of an example process 600 for applying a level of QoS to an application. FIG. 6B shows a device 610, LTE network 620, PGW 250, PCRF 270, API-GW 275, network 280, privacy engine 285 and XYZ conference provider 690.

An example of LTE network 620 may correspond to one or more devices (e.g., base station 220, SGW 230, MME 240, and CSCF server 265) that make up the access, EPS, and IMS core segments, described with regard to FIG. 2. An example of XYZ conference provider 690 may correspond to provider 290, described with regard to FIG. 2.

As shown in FIG. 6B, assume that device 610 is connected to XYZ conference provider 690, via LTE network 620 and network 280. Assume that Ben (the user of device 610) has selected the QoS option in the XYZ conference application (on device 610), described with regard to FIG. 6A. Ben may be given an option of selecting a level of QoS. For example, Ben may have the choice to increase or decrease the level of QoS, for the XYZ conference application. Level 1 may indicate the highest level of QoS available. Level 1 may be equivalent to QCI level 1. Level D may indicate the default level of QoS for the XYZ conference application. Level D may be equivalent to QCI level 8. There may be additional, or fewer, options available to Ben. Each level of QoS may provide a different level of quality that may also have different financial charges that are charged to a user (such as Ben) of an application (such as XYZ conference). Ben may also have the option to stop applying any level of QoS to the XYZ conference application, at a later time.

Ben decides that he wants a higher level of QoS for the XYZ conference application being used on device 610. Ben may select, using the arrow buttons (displayed on the screen), level 1 of QoS. Upon Ben selecting level 1, a request for QoS message is sent from the XYZ conference application to XYZ conference provider 690. XYZ conference provider 690 may receive the QoS request from device 610, via PGW 250.

XYZ conference provider 690 may send the QoS request to API-GW 275, via network 280. API-GW 275 may be a part of LTE network 620. API-GW 275 may receive the QoS request from XYZ conference provider 690. API-GW 275 may store identifier information about device 610. API-GW 275 may store information about Ben's request to apply a level of QoS to the XYZ conference application. API-GW 275 may send an authentication request to privacy engine 285.

Privacy engine 285 may authorize device 610 by validating that device 610 is authorized to use LTE network 620. Privacy engine 285 may authorize the XYZ conference application by making sure that the XYZ conference application has permission to use LTE network 620 to receive an increase (or decrease) to the level of QoS for the XYZ conference application. API-GW 275 may receive the authentication result from privacy engine 285. API-GW 275 may send a message to PCRF 270 so that PCRF 270 (using policies and rules) may send a notification to other network devices in LTE network 620 (e.g., base station 220, SGW 230, MME 240, and/or PGW 250) to apply the requested level of QoS (QCI level 1) to the XYZ conference application on device 610. When information is sent between the application and XYZ conference provider 690, through LTE network 620, the QCI level 1 of QoS is applied to the information. The QCI level 1 may include applying a packet delay budget (e.g., 100 ms), providing a guaranteed bit rate (GBR), and/or providing a particular latency for the information sent between the XYZ conference application (being used on device 610) and XYZ conference provider 690.

The XYZ conference application is now given QCI level 1 of QoS. API-GW 275 may store the authentication result. API-GW 275 may send a QoS result to XYZ conference provider 690, via network 280. XYZ conference provider 690 may send the QoS result to device 610. Ben may receive a message (e.g., from XYZ conference provider 690) that the request to apply a level of QoS to the application is successful. Ben may now use the XYZ conference application with a QCI level 1 of QoS. By using the increased level of QoS, the black pixels (as shown in FIG. 6A) are removed.

Systems and/or methods described herein may allow a user, of a user device, to apply a level of QoS to an application. The application may communicate information, with a provider, that is provided with a level of QoS by a network. As a result, the user may have a better experience (e.g., clearer voice capabilities, fewer failed transactions, better quality video, etc.) than using the application without applying the level of QoS.

The foregoing description of implementations provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 4 and 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code--it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
 a first network device, implemented at least partially in hardware, to:
  receive information regarding a quality of service application that is part of an application stored on a user device, the information identifying different quality of service levels that can be applied to the application;
  receive, based on user interaction with the application, a first request for a network to apply a level of quality of service to the application;
  send, based on receiving the first request, an authorization request to a second network device, the second network device initiating, based on the authorization request, a process to authenticate the application;
  receive, based on sending the authorization request, an authorization result from the second network device that the application is authorized to receive the level of quality of service;
  send a first message to a third network device, the third network device notifying the network to apply the level of quality of service to information sent between the application and a provider associated with the application;
  receive a response from the third network device that the level of quality of service is applied to the information sent between the application and the provider;
  send a message to the provider that the level of quality of service is applied to the information sent between the application and the provider;
  receive, from the user device, a second request to apply a particular level of quality of service to another application at a same time that the level of quality of service is applied to the application;
  deny the second request to apply the particular level of quality of service to the other application without communicating with the second network device; and
  notify the user device that the particular level of quality of service is not applied to the other application.

2. The system of claim 1, where the first network device is further to:
 receive a third request to stop applying the level of quality of service to the application;
 send a fourth request, based on receiving the third request, to the third network device to stop applying the level of quality of service to the application, the third network device notifying the network to stop applying the level of quality of service to the information sent between the application and the provider;
 receive a notification from the third network device that the level of quality of service is no longer applied to the information sent between the application and the provider; and
 send a message to the provider, based on receiving the notification, that the level of quality of service is no longer applied to the information sent between the application and the provider.

3. The system of claim 1, where the first network device is further to:
 receive a third request to change the level of quality of service being applied to the application;
 send a fourth request to the third network device, based on the third request, to change the level of quality of service applied to the application;
 receive another response from the third network device, based on the third request, that the level of quality is changed and a new level of quality of service is applied to the information sent between the application and the provider; and
 send a message to the provider that the level of quality of service is changed and the new level of quality of service is applied to the information sent between the application and the provider.

4. The system of claim 1, where the first network device is further to:
 receive a third request to apply a particular level of quality of service to a second application stored on the user device;
 send a fourth request, based on receiving the third request, to the second network device, the second network device initiating, based on the fourth request, a process to authorize the second application;
 receive another response from the second network device, based on the fourth request, that the second application is not authorized to receive the particular level of quality of service; and
 send, based on the second application not being authorized, a second message to the user device that the particular level of quality of service is not applied to the second application.

5. The system of claim 1, where, when receiving the information regarding the quality of service application, the first network device is to:
receive the information from the provider.

6. The system of claim 1, where the first network device is further to:
receive a third request to apply a particular level of quality of service to an additional application;
send a fourth request, based on receiving the third request, to the second network device, the second network device initiating, based on the fourth request, a process to authorize the additional application;
receive a second authorization result from the second network device, based on the fourth request, that the additional application is authorized;
send a notification to the third network device based on receiving the second authorization result, the third network device initiating, based on the notification, a process to apply the particular level of quality of service to information sent between the additional application and a second provider associated with the additional application;
receive a second message, from the third network device, that the particular level of quality of service is applied to information sent between the additional application and the second provider; and
send a third message to the user device that the particular level of quality of service is applied to the additional application.

7. The system of claim 6, where the information identifying the different quality of service levels for the application is different than information regarding quality of service levels for the additional application.

8. The system of claim 1, where the first network device is further to:
receive a third request to apply a particular level of quality of service to an additional application;
send a fourth request, based on receiving the third request, to the second network device, the second network device initiating a process, based on the fourth request, to authorize the additional application to receive the particular level of quality of service;
receive a second authorization result, from the second network device, that the additional application is not authorized to receive the particular level of quality of service; and
send, based on the second authorization result, a second message to the user device that the particular level of quality of service is not applied to the additional application.

9. A method comprising:
receiving, by a first network device, information regarding a quality of service application that is part of an application stored on a user device, the information identifying different quality of service levels that can be applied to the application;
receiving, by the first network device and based on user interaction with the application, a first request to apply a level of quality of service to the application;
sending, by the first network device based on receiving the first request, an authorization request to a second network device, the second network device initiating, based on the authorization request, a process to authenticate the application;
receiving, by the first network device, an authorization result, from the second network device, for the application;

sending, by the first network device and based on the authorization result received from the second network device, an instruction, to a third network device, to apply the level of quality of service to the application, the third network device initiating, based on the instruction, a process to apply the level of quality of service to information sent between the application and a provider of the application;
selectively processing, based on receiving a quality of service result from the third network device, information sent between the application and the provider;
receiving, by the first network device, a second request to apply a particular level of quality of service to another application stored on the user device;
denying, by the first network device, the second request to apply the particular level of quality of service to the other application; and
notifying, by the first network device, the user device that the particular level of quality of service is not applied to the other application.

10. The method of claim 9, further comprising:
receiving a third request to apply a particular level of quality of service to an additional application, stored on the user device, at a same time the level of quality of service is applied to the application;
accepting the third request to apply the particular level of quality of service to the additional application; and
notifying the user device that the particular level of quality of service is applied to the additional application.

11. The method of claim 9, where the application is a streaming video application and the other application is an audio application.

12. The method of claim 9, where selectively processing the information sent between the application and the provider includes:
providing a guaranteed bit rate to the information sent between the application and the provider.

13. The method of claim 9, where
the authorization result, from the second network device, includes a message to the first network device that the application is not authorized, and the method further includes:
sending a message to the user device, based on the authorization result, that the level of quality of service is not applied to the information sent between the application and the provider.

14. A non-transitory computer-readable medium storing instructions, the instructions comprising:
a plurality of instructions that, when executed by one or more processors of a first network device, cause the one or more processors to:
receive information regarding a quality of service application that is part of an application stored on a user device, the information identifying different quality of service levels that can be applied to the application;
receive, based on user interaction with the application, a first request for a network to apply a level of quality of service to the application stored on the user device;
send, based on receiving the first request, an authorization request to a second network device, the second network device initiating, based on the authorization request, a process to authenticate the application;
receive, based on the authorization request, an authentication result from the second network device that the application is authorized to receive the level of quality of service;

send a first message to a third network device, the third network device notifying the network to apply the level of quality of service to information sent between the application and a provider associated with the application;
receive a response from the third network device that the level of quality of service is applied to the information sent between the application and the provider;
send a second message to the provider that the level of quality of service is applied to the information sent between the application and the provider;
receive, from the user device, a second request to apply a particular level of quality of service to another application at a same time that the level of quality of service is applied to the application;
deny the second request to apply the particular level of quality of service to the other application without communicating with the second network device; and
notify the user device that the particular level of quality of service is not applied to the other application.

15. The non-transitory computer-readable medium of claim 14, further comprising:
one or more instructions to:
store the authorization result; and
remove the authorization result when a session between the user device and the provider is terminated.

16. The non-transitory computer-readable medium of claim 14, where the instructions further include:
one or more instructions to:
receive a third request, the third request including information requesting a change to the level of quality of service;
send a fourth message to the third network device, the third network device notifying, based on the fourth message, the network to change the level of quality of service;
receive another response from the third network device that the network has changed the level of quality of service; and
send a fifth message to the provider that the level of quality of service is changed.

17. The non-transitory computer-readable medium of claim 14, where one or more instructions, of the plurality of instructions, to authorize the application include one or more instructions to:
determine whether the application is authorized to receive changes to the level of quality of service to the application; and
authorize, based on the application being authorized to receive changes to the level of quality of service to the application, the application.

18. The non-transitory computer-readable medium of claim 14, where the instructions further include:
one or more instructions to:
receive a third request to stop applying the level of quality of service to the application;
send a fourth request, based on receiving the third request, to the third network device to stop applying the level of quality of service to the application, the third network device notifying the network to stop applying the level of quality of service to the information sent between the application and the provider;
receive a notification from the third network device that the level of quality of service is no longer applied to the information sent between the application and the provider; and
send a message to the provider, based on receiving the notification, that the level of quality of service is no longer applied to the information sent between the application and the provider.

19. The non-transitory computer-readable medium of claim 14, where the instructions further include:
one or more instructions to:
receive a third request to apply a particular level of quality of service to an additional application;
send a fourth request, based on receiving the third request, to the second network device, the second network device initiating a process, based on the fourth request, to authorize the other application to receive the particular level of quality of service;
receive a second authorization result, from the second network device, that the additional application is not authorized to receive the particular level of quality of service; and
send, based on the second authorization result, a second message to the user device that the particular level of quality of service is not applied to the additional application.

20. The non-transitory computer-readable medium of claim 14, where the instructions further include:
one or more instructions to:
receive a third request to apply a particular level of quality of service to an additional application at a same time that the level of quality of service is applied to the application;
send a fourth request, based on receiving the third request, to the second network device, the second network device initiating, based on the fourth request, a process to authorize the additional application;
receive a second authorization result from the second network device, based on the fourth request, that the additional application is authorized;
send a notification to the third network device based on receiving the second authorization result, the third network device initiating, based on the notification, a process to apply the particular level of quality of service to information sent between the additional application and a second provider associated with the additional application;
receive a second message, from the third network device, that the particular level of quality of service is applied to information sent between the additional application and the second provider; and
send a third message to the user device that the particular level of quality of service is applied to the additional application.

* * * * *